(12) United States Patent
Tow (10) Patent No.: US 11,549,427 B2
(45) Date of Patent: Jan. 10, 2023

(54) ENGINE AND FAN SYSTEM HAVING AN ELECTRIC MOTOR

(71) Applicant: Caterpillar Inc., Peoria, IL (US)

(72) Inventor: Tryg Carl Tow, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 174 days.

(21) Appl. No.: 16/852,265

(22) Filed: Apr. 17, 2020

(65) Prior Publication Data

US 2021/0324782 A1 Oct. 21, 2021

(51) Int. Cl.
*F01P 5/04* (2006.01)
*F02B 67/06* (2006.01)
*F01N 5/02* (2006.01)

(52) U.S. Cl.
CPC ............ *F01P 5/04* (2013.01); *F01N 5/025* (2013.01); *F02B 67/06* (2013.01); *F01P 2005/046* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,283,527 A | * | 11/1966 | Cauvin | F01P 7/048 236/35 |
| 6,055,946 A | * | 5/2000 | Dombek | F01P 7/084 123/41.11 |
| 9,850,909 B2 | | 12/2017 | Roby et al. | |
| 10,340,769 B2 | | 7/2019 | Bahr et al. | |
| 2002/0062183 A1 | * | 5/2002 | Yamaguchi | B60K 6/543 903/905 |
| 2010/0122673 A1 | | 5/2010 | Krafft | |
| 2017/0001581 A1 | * | 1/2017 | Rinker | F02D 41/021 |
| 2017/0122254 A1 | * | 5/2017 | Urch | F01K 27/02 |

FOREIGN PATENT DOCUMENTS

| | | | | |
|---|---|---|---|---|
| CN | 105720766 | | 5/2018 | |
| CN | 108137164 A | * | 6/2018 | ............ B64D 33/08 |
| CN | 108216546 A | * | 6/2018 | ............ B63H 21/20 |
| DE | 3345340 A1 | * | 6/1985 | |
| JP | 2016005398 | | 1/2016 | |
| WO | 2018229670 | | 12/2018 | |
| WO | WO-2019225179 A1 | * | 11/2019 | ............ F02D 29/02 |

* cited by examiner

*Primary Examiner* — George C Jin
*Assistant Examiner* — Teuta B Holbrook
(74) *Attorney, Agent, or Firm* — Lee & Hayes, P.C.

(57) ABSTRACT

A system includes an engine having a crankshaft and an electric motor having a shaft, the shaft including a first end and a second end. The system further includes a power source in electrical communication with the electric motor, the power source configured to provide electrical power to the electric motor, a reduction drive coupled to the crankshaft and to the first end of the shaft of the electric motor, and a fan coupled to the second end of the shaft of the electric motor, wherein rotation of the shaft of the electric motor drives rotation of the fan.

18 Claims, 7 Drawing Sheets

FIG. 7

ENGINE AND FAN SYSTEM HAVING AN ELECTRIC MOTOR

TECHNICAL FIELD

The present disclosure relates to an engine and fan system. More specifically, the present disclosure relates to a system that includes a dual shaft electric motor including a shaft having a first end driving a radiator fan and a second end coupled to an engine.

BACKGROUND

Internal combustion engines include many parasitic loads. Such parasitic loads create various power losses in an engine system. Examples of parasitic loads in an internal combustion engine include, but are not limited to, various pumps, flywheels, transmissions, cooling systems (e.g., radiator fans), driveshafts, differentials, etc. As such, various technologies are implemented in order to reduce and/or eliminate parasitic loads.

However, incorporating such technologies into existing engine systems often requires specific alterations to the engine system. In many examples, these alterations are costly and require structural changes in the engine system. For example, a supercharger provides additional power to the engine system. However, incorporating a supercharger into an engine system requires specific hardware and alterations to the engine system, and these hardware and alterations are costly. Another example is the inclusion of an electric motor to drive a radiator fan. However, costs of incorporating such electric motors in an engine radiator system are often high. Furthermore, these electric motor systems are often large in size and typically require multiple electric motors to be implemented.

An example system for reducing parasitic load is described in U.S. Patent Publication No. 2010/0144219 (hereinafter referred to as the '219 reference). In particular, the '219 reference describes a marine propulsion system. The marine propulsion system described in the '219 reference includes a hybrid system having combustion engines, electric generators and motors, and an electrical storage device. For example, the '219 reference describes a propulsion system that generates and stores electrical power. Furthermore, the propulsion system in the '219 reference drives a propulsion device (such as a propeller) either by the combustion engines or the electric motors. For example, the '219 reference describes that the propulsion system is driven by the combustion engine and that a drive shaft driven by the combustion engine may be disconnected from an electric motor via a clutch and the electric motor may drive the propulsion device instead of the combustion engine. Furthermore, the '219 reference describes alternate configurations of the propulsion system that allow the propulsion system to drive the propulsion device via the combustion engine and/or the electric motor, generate and store electric power, and power various external loads on a marine vessel. The '219 reference does not, however, describe a system in which an electric motor is incorporated in an engine radiator system such that a combustion engine or the electric motor may drive the radiator fan without connecting or disconnecting drive shafts of the engine radiator system. The system described in the '219 reference is not configured to, among other things, provide an electric motor that drives a radiator fan by the electric motor and/or the combustion engine while, at times, reducing parasitic load in an engine system. As a result, the system described in the '219 reference requires additional hardware and alterations that increase the complexity of an engine system.

Example embodiments of the present disclosure are directed toward overcoming the deficiencies described above.

SUMMARY

An example system includes an engine having a crankshaft and an electric motor having a shaft including a first end and a second end. The system further includes a power source in electrical communication with the electric motor, the power source configured to provide electrical power to the electric motor, a reduction drive coupled to the crankshaft and the first end of the shaft of the electric motor, and a fan coupled to the second end of the shaft of the electric motor, wherein rotation of the shaft of the electric motor drives rotation of the fan.

An example engine cooling system includes an engine having a crankshaft and an electric motor configured to rotate a shaft including a first end and a second end. The engine cooling system further includes a reduction drive mechanically coupled to the crankshaft and the first end of the shaft of the electric motor and a fan coupled to the second end of the shaft of the electric motor, wherein the electric motor is configured to rotate the fan based at least in part on an amount of power supplied to the electric motor being equal to or greater than a threshold amount of power.

In a further example, a system includes an engine having an output shaft and an electric motor in electrical communication with a power source and configured to rotate a shaft that includes a first end and a second end. The system further includes a belt and pulley system mechanically coupled to the crankshaft and the first end of the shaft of the electric motor, the belt and pulley system configured to transfer rotational power between the crankshaft and the shaft of the electric motor, and a radiator fan coupled to the second end of the shaft of the electric motor such that rotation of the shaft drives rotation of the radiator fan.

DETAILED DESCRIPTION

Figure 1:
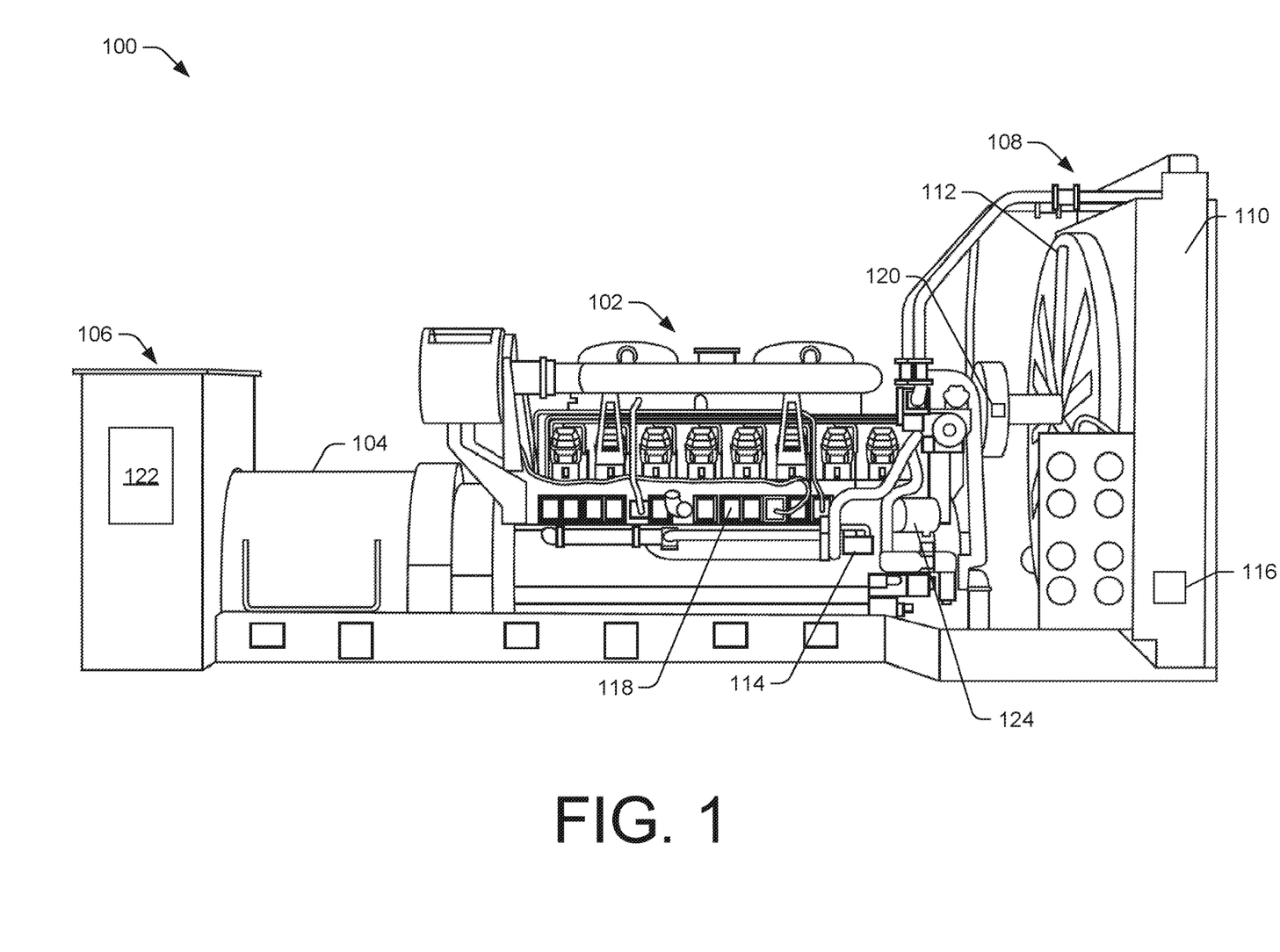
FIG. 1 is an engine system in accordance with an example of the present disclosure.

Wherever possible, the same reference numbers will be used throughout the drawings to refer to the same or like parts. FIG. 1 depicts an example engine system 100. In some examples, the engine system 100 includes non-vehicular engine systems such as generators or other non-vehicular engine systems. For example, the engine system 100 includes stationary installations. However, in some examples, the engine system 100 may include mobile engine systems such as a marine engine system, vehicular engine system, etc.

The engine system 100 includes an engine 102. The engine 102 includes an internal combustion engine that is configured to generate mechanical energy via combustion of various fuel types (e.g. gasoline, natural gas, diesel, etc.). The engine system 100 converts the mechanical energy into electrical power via an alternator 104 or other rotor and stator system that converts the mechanical energy into electrical power. The engine system 100 includes a terminal box 106. The terminal box 106 provides various connection interfaces for external circuit systems to be connected to the engine system 100 (e.g., generator). In some examples, the terminal box 106 includes circuit breakers. The terminal box 106 may also include a control panel (not shown) that provides control, protection, and monitoring of the engine system 100 (e.g., the engine 102 and generator systems). In some examples, the engine system 100 is used in combination with additional engine systems.

The engine system 100 also includes an engine radiator system 108. The engine radiator system 108 provides a heat exchange system used to reduce a temperature of the engine 102 and/or components therein through heat transfer. The engine radiator system 108 includes a radiator 110 and a radiator fan 112. The engine 102 is cooled by circulating coolant (or other liquid(s)) through an engine block of the engine 102 where a temperature of the coolant increases due to thermal energy transferred from the engine block to the coolant (i.e., the coolant absorbs heat from the engine). The coolant is then circulated through the radiator 110 where the temperature of the coolant decreases by transferring thermal energy from the coolant outside of to the radiator 110 to, for example, ambient air. The coolant then returns to the engine 102. In the engine radiator system 108, the radiator fan 112 forces air through the radiator 110, thereby increasing a rate of heat exchange between the radiator 110 and air surrounding the radiator 110. In some examples, the radiator fan 112 is mechanically coupled to an output shaft (such as a crankshaft) of the engine 102. The radiator fan 112 may be mechanically coupled via a reduction drive (such as a belt system, a gear system, or other front accessory drive system) to adjust a rotational speed of the output shaft of the engine 102 as it drives the radiator fan 112.

The engine system 100 further includes one or more sensors that detect and/or measure properties of one or more components of the engine system 100. For example, the engine system 100 may include one or more thermal sensors 114 configured to determine a temperature of the engine 102, engine block, coolant, or other components of the engine 102. For example, the one or more thermal sensors 114 includes an engine coolant temperature sensor that measure a temperature of the coolant in the engine system 100. In some examples, the engine system 100 includes a first thermal sensor 114 that senses a temperature of the coolant in the engine block and includes a second thermal sensor 116 that senses a temperature of the coolant in the radiator 110. The engine system 100 may include additional thermal sensors that measure temperatures of other components of the engine system 100.

The engine system 100 further includes a crankshaft position sensor 118. The crankshaft position sensor 118 is configured to determine a position of the crankshaft of the engine 102. Additionally, and/or alternatively, the crankshaft position sensor 118 is configured to measure engine speed of the engine 102. The engine speed is measured in revolutions per minute (RPM), which indicates a number of rotations the crankshaft will complete in one minute. Furthermore, the engine system 100 may also include a radiator fan speed sensor 120 that measures a rotational speed of the radiator fan 112. The radiator fan speed sensor 120 measures the rotational speed of the fan in RPM. The engine system 100 may be configured such that when the engine 102 operates at a predefined engine speed, the engine 102 transfers rotational energy to the radiator fan 112 such that the radiator fan 112 operates at a predefined radiator fan speed. In some examples, the engine system 100 includes additional sensors to measure other metrics of the engine system 100.

Furthermore, the engine system 100 may include an engine control system that includes a controller 122 and one or more sensors. The controller 122 is configured to control at least a portion of the operations of the engine system 100. Furthermore, the controller 122 may monitor the temperature of the coolant in the engine 102 and in the radiator 110, engine speed, radiator fan speed, among other metrics of the engine system 100 via the one or more sensors described above (e.g., thermal sensors 114 and 116, crankshaft position sensor 118, and radiator fan speed sensor 120).

The controller 122 may be, for example, a hardware electronic control module (ECM) or other electronic control unit (ECU). The controller 122 includes, for example, a microcontroller, memory (e.g., RAM), storage (e.g., EEPROM or Flash) configured to perform the described functions of the controller 122. The controller 122 controls at least a portion of the operations of the engine system 100 including the engine 102 and the engine radiator system 108. Instead of, or in addition to, an ECM/ECU the controller 122 may include a general computer microprocessor configured to execute computer program instructions (e.g., an application) stored in memory to perform the disclosed functions of the controller 122. As mentioned, the controller 122 includes a memory, a secondary storage device, processor(s), and/or any other computing components for running an application. Various other circuits may be associated with controller 122 such as power supply circuitry, signal conditioning circuitry, or solenoid driver circuitry. In some examples, the controller 122 and/or a portion of components of the controller 122 may be located remotely from the engine system 100 and may be communicatively coupled to the engine system 100.

The controller 122 may be communicatively coupled to the one or more sensors described above. For example, the controller 122 is communicatively coupled to the thermal sensors 114 and 116. Thus, the controller 122 determines a temperature of coolant in the engine block and a temperature of the coolant in the radiator 110 via the thermal sensors 114 and 116. From such measurements, the controller 122 may determine a difference in temperature between the coolant in the engine block and the coolant in the radiator 112. The controller 122 may also be communicatively coupled to the crankshaft position sensor 118 may determine a rotational speed of the crankshaft via the crankshaft position sensor 118. In some examples, the controller 122 is configured to maintain a constant (or substantially constant) engine speed of the engine 102. For example, the engine system 100 may include a generator that may operate at a constant engine speed in order to deliver constant electric power to an external circuit and/or components connected to such external circuits.

For example, the controller 122 may be configured to maintain an engine speed of approximately 1800 RPM. Additionally, and/or alternatively, the controller 122 may be configured to maintain a constant engine speed (e.g., 1800 RPM) within a predefined tolerance (e.g., +/−100 RPM). In some examples, the controller 122 may be configured to maintain engine speed in a predefined range. For example, the controller 122 may be configured to maintain engine speed between approximately 1700-1900 RPM. Furthermore, the controller 122 may be communicatively coupled to the radiator fan speed sensor 120. The controller 122 determines a speed of the radiator fan 112 via the radiator fan speed sensor 120. In some examples, the controller 122 is configured to increase or decrease an amount of fuel provided to the engine 102 in order to maintain a predetermined engine speed as described above. The controller 122 may increase or decrease the amount of fuel provided to the engine 102 in order to maintain engine speed as various parasitic loads draw power from the engine 102. In some examples, the controller 122 may rely on one or more data maps, look-up tables, algorithms, etc. to modify engine speed.

The engine system 100 may further include a governor 124. The governor 124 is configured to control engine speed of the engine 102 at least in part by controlling an amount of fuel provided to the engine 102. In some examples, the governor 124 may control engine speed and an amount of fuel provided to the engine 102 instead of or in addition to the controller 122. The governor 124 may be a constant-speed type governor, variable-speed type governor, speed-limiting type governor, or load-type governor. For example, the governor 124 may be configured to maintain a constant speed of the engine 102 regardless of a load imparted on the engine 102. Additionally, and/or alternatively, the governor 124 may be configured to manually control engine speed over a speed range (e.g., between 1600 RPM and 1800 RPM) and/or be controlled by an outside device (such as the controller 122 or other device). In some examples, the governor 124 is configured to maintain engine speed equal to and/or above a minimum engine speed (e.g., 1600 RPM) and below and/or equal to a maximum engine speed (e.g., 1800 RPM). Still further, the governor 124 may be configured to ensure that the engine 102 is not loaded above a predetermined limit. In such an example, the governor 124 limits an amount of fuel supplied to the engine 102 to ensure that the engine 102 load does not exceed the predetermined limit. In some examples, the governor 124 performs more than one of the above described functions simultaneously. Furthermore, the governor 124 may include a mechanical governor, a hydraulic governor, or an electric governor. In an example where the governor 124 includes an electric governor, the controller 122 is communicatively coupled to the governor 124 and the controller 122 provides a speed set signal to the governor 124 that causes the governor 124 to maintain a predefined engine speed. In some examples, the engine system 100 includes multiple governors and may include multiple types of governors. As mentioned previously, the engine 102 may include a diesel engine and the governor 124 may control engine speed of the engine 102 by controlling an amount of fuel that is injected into the engine 102 by injectors.

Figure 2:
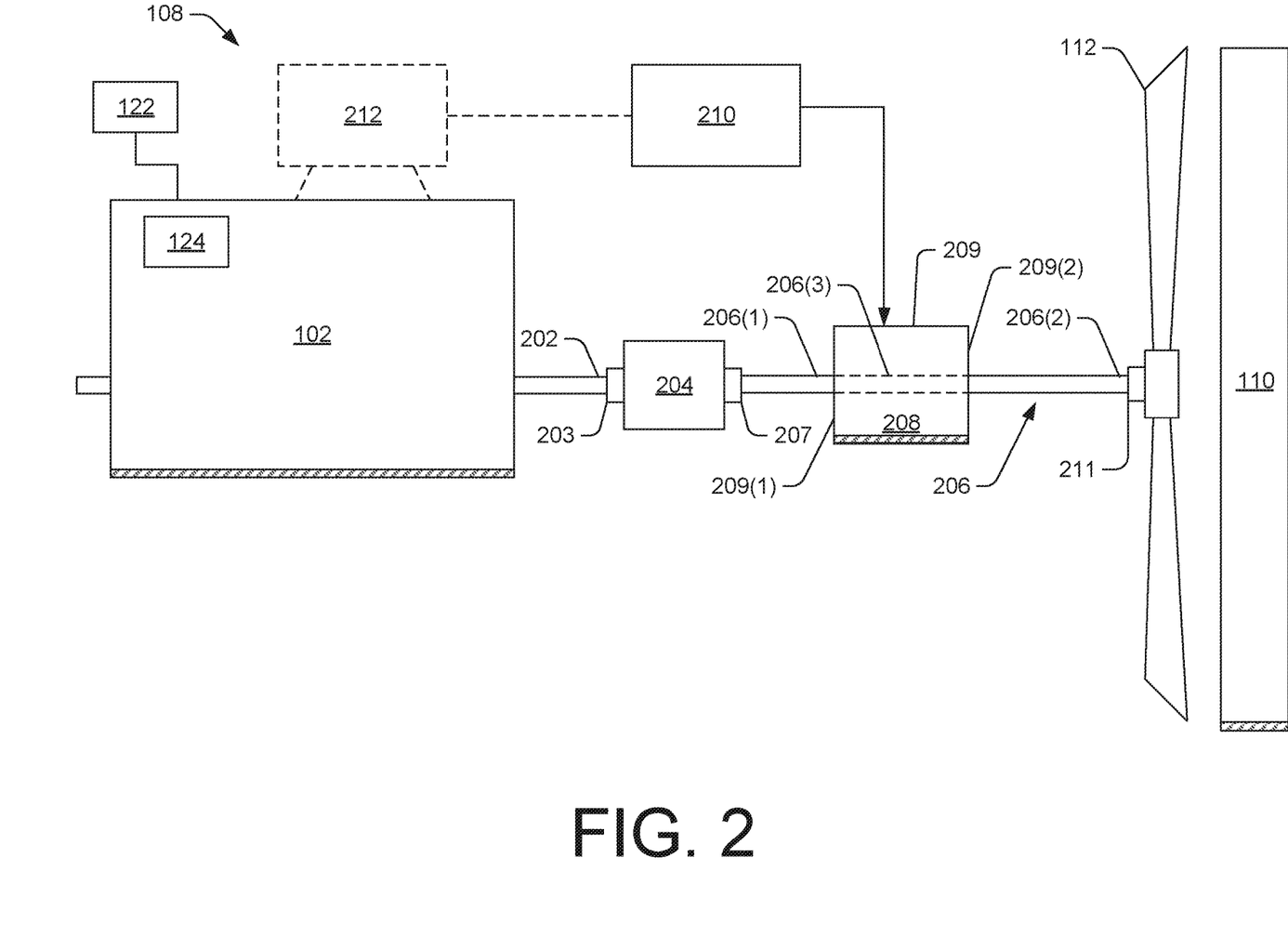
FIG. 2 is a schematic illustration of an engine radiator system in accordance with an example of the present disclosure.

FIG. 2 illustrates an example diagram of an engine radiator system 108. As shown in FIG. 2, the engine 102 includes an output shaft, such as a crankshaft 202, that is rotated by the engine 102. In some examples, the crankshaft 202 is be mechanically coupled to a reduction drive 204. The reduction drive 204 may be a gearbox, gear train, belt system, pulley system, or other reduction drive systems. For example, the reduction drive 204 may be a front end accessory drive (FEAD) system. In some examples, the FEAD system is at least partially attached to a portion of the engine 102. The crankshaft 202 is coupled to the reduction drive 204 via one or more gears, belts, or other types of mechanical couplings 203. For example, the crankshaft 202 may include a pinion that turns against a gear of the reduction drive 204. Alternatively, the crankshaft 202 may include a pulley that is configured to translate rotational power to the reduction drive 204 via a belt. In some examples, the reduction drive 204 is configured to adjust rotational speed (and/or torque) of various drive shafts relative to one another that are coupled to the reduction drive 204. For example, the reduction drive 204 receives a shaft (such as the crankshaft 202) rotating at a first speed and transfers energy from the first shaft to drive rotation of a second shaft at a second speed that is greater than or less than the first speed or vis versa. Thus, the reduction drive 204 transfers rotational power from the crankshaft 202 to a drive shaft while adjusting a rotational speed between the crankshaft 202 and the drive shaft. In some examples, the transfer of rotational energy may switch such that the reduction drive 204 transfers rotational energy from the drive shaft to the crankshaft 202.

In some examples, the drive shaft includes a shaft 206 of an electric motor 208. The electric motor 208 includes a dual shaft electric motor including a shaft 206 having a first end 206(1) coupled to the crankshaft 202 via the reduction drive 204 and a second end 206(2) coupled the radiator fan 112. A dual shaft electric motor refers to an electric motor having a single shaft with an end protruding on both sides of the electric motor 208. In some examples, the electric motor 208 includes a housing 209 having walls defining an internal space. The housing 209 includes a first wall 209(1) and a second wall 209(2) that is opposite the first wall 209(1). The first wall 209(1) includes a first aperture and the second wall 209(2) includes a second aperture. The shaft 206 includes the first end 206(1) extending through the first aperture of the housing 209 and the second end 206(2) extending through the second aperture. The shaft 206 also includes a central portion 206(3) located in the internal space of the housing of the electric motor 208. The central portion 206(3) is disposed between and connects the first end 206(1) and the second end 206(2). In some examples, the first end 206(1) of the shaft 206 is coupled to the reduction drive 204 via coupling 207 and receives rotational power from the crankshaft 202 via the reduction drive 204. The second end 206(2) of the shaft 206 is coupled to the radiator fan 112 via coupling 211 and is configured to rotate the radiator fan 112 when the shaft 206 is rotated by the crankshaft 202 and/or the electric motor 208.

Furthermore, the electric motor 208 is in electrical communication with a power source 210. The power source 210 is configured to provide electrical power to the electric motor 208 such that the electric motor 208 rotates the shaft 206 and thereby rotates the radiator fan 112. The power source 210 includes any type of electrical power source. For example, the power source 210 may include a battery. In some examples, the battery may be charged by a solar panel, the engine 102 (via an alternator), etc. Additionally, and/or alternatively, the power source 210 may include a turbo compounder 212 configured to convert waste heat energy (e.g., exhaust) from the engine 102 into electric power. For example, the turbo compounder 212 includes a turbine that is configured to recover energy from exhaust gases from the engine 102 and to convert the energy into electric power. The electric power generated by the turbo compounder 212 may be provided directly to the electric motor 208 via wiring. In some examples, the power source 210 includes other systems configured to convert waste heat energy into electric power.

In some examples, the engine radiator system 108 is configured such that the radiator fan 112 is rotated at least in part by the engine 102 when an amount of power supplied to the electric motor 208 by the power source 210 is less than a threshold amount of power. For example, if the amount of power supplied to the electric motor 208 by the power source 210 is less than a threshold amount, the engine 102 imparts a rotational force on the shaft 206 of the electric motor 208 via the crankshaft 202 and the reduction drive 204. The threshold amount of power may comprise an amount of power necessary to drive the electric motor 208 such that the electric motor 208 rotates the radiator fan 112 at a predefined rotational speed (e.g., 1500 RPM) and/or between a rotational speed range (e.g., 1500-2500 RPM). The threshold amount of power may represent an amount of power necessary for the electric motor 208 to solely drive the radiator fan 112, thereby reducing and/or eliminating the parasitic load imparted on the engine 102 by driving the radiator fan 112. In some examples, the engine 102 rotates the radiator fan 112 instead of or in addition to the electric motor 208 when the amount of power supplied by the power source 210 is less than a threshold amount. In one example, if the electric motor 208 does not receive power from the power source 210, the engine 102 rotates the radiator fan 112 instead of the electric motor 208. In some examples, the controller 122 increases an amount of fuel that is provided to the engine 102 in order to compensate for the increased load on the engine 102 by driving the radiator fan 112. Additionally, and/or alternatively, the governor 124 is configured to increase the amount of fuel provided to the engine 102 based at least in part on the increased load of driving the radiator fan 112. Thereby, the controller 122 and/or the governor 124 maintain a constant engine speed of the engine 102 as the parasitic load of driving the radiator fan 112 increase or decreases.

In another example, if the electric motor 208 receives an amount of power, but the amount of power is less than a threshold amount, the engine 102 may supplement the output of the electric motor 208 in order to maintain a rotational speed of the radiator fan 112. Thus, if the electric motor 208 receives an amount of power from the power source 210 that is less than the threshold amount of power, the electric motor 208 may reduce an amount of power loss in the engine system 100 caused by rotating the radiator fan 112. In some examples, the engine radiator system 108 is configured such that the crankshaft 202 and the shaft 206 of the electric motor 208 rotate in conjunction and power flow through the various shafts (e.g., the crankshaft 202 and the shaft 206) is transferred without making determinations or adjustments to the engine radiator system 108. In other words, rotational power is automatically transferred in the engine radiator system 108 via the crankshaft 202, the reduction drive 204, and the shaft 206 of the electric motor 208 based at least in part on the amount of power supplied to the electric motor 208. Furthermore, the electric motor 208 may be configured to rotate the shaft 206 when the electric motor 208 receives any amount of electric power. Therefore, the threshold amount of power may comprise an amount of power supplied to the electric motor 208 that effectually eliminates (or reduces) the parasitic load imparted on the engine 102 by driving the radiator fan 112.

In still another example, if the electric motor 208 receives an amount of power from the power source 210 that meets the threshold amount of power, the electric motor 208 may rotate the shaft 206, thereby rotating the radiator fan 112. When the electric motor 208 receives the threshold amount of power from the power source 210, the electric motor 208 significantly reduces and/or eliminates a parasitic load in the engine system 100 caused by rotating the radiator fan 112 by the engine 102. In such an example, the crankshaft 202 rotates with the shaft 206 of the electric motor 208 without transferring power from the crankshaft 202 to the shaft 206. Furthermore, as described above, the controller 122 and/or the governor 124 reduce an amount of fuel provided to the engine 102 when the electric motor 208 drives rotation of the radiator fan 112. In a further example, if the amount of power supplied to the electric motor 208 by the power source 210 exceeds a threshold amount of power, the electric motor 208 may return power to the engine 102 via the shaft 206 and the crankshaft 202. For example, when an amount of power supplied to the electric motor 208 by the power source 210 exceeds a threshold amount, the electric motor 208 imparts a rotational force on the crankshaft 202 of the engine 102 via the shaft 206 and the reduction drive 204. Thus, the controller 122 and/or governor 124 reduce an amount of fuel that is provided to the engine 102 when the amount of power supplied to the electric motor 208 exceeds the threshold amount.

Figure 3:
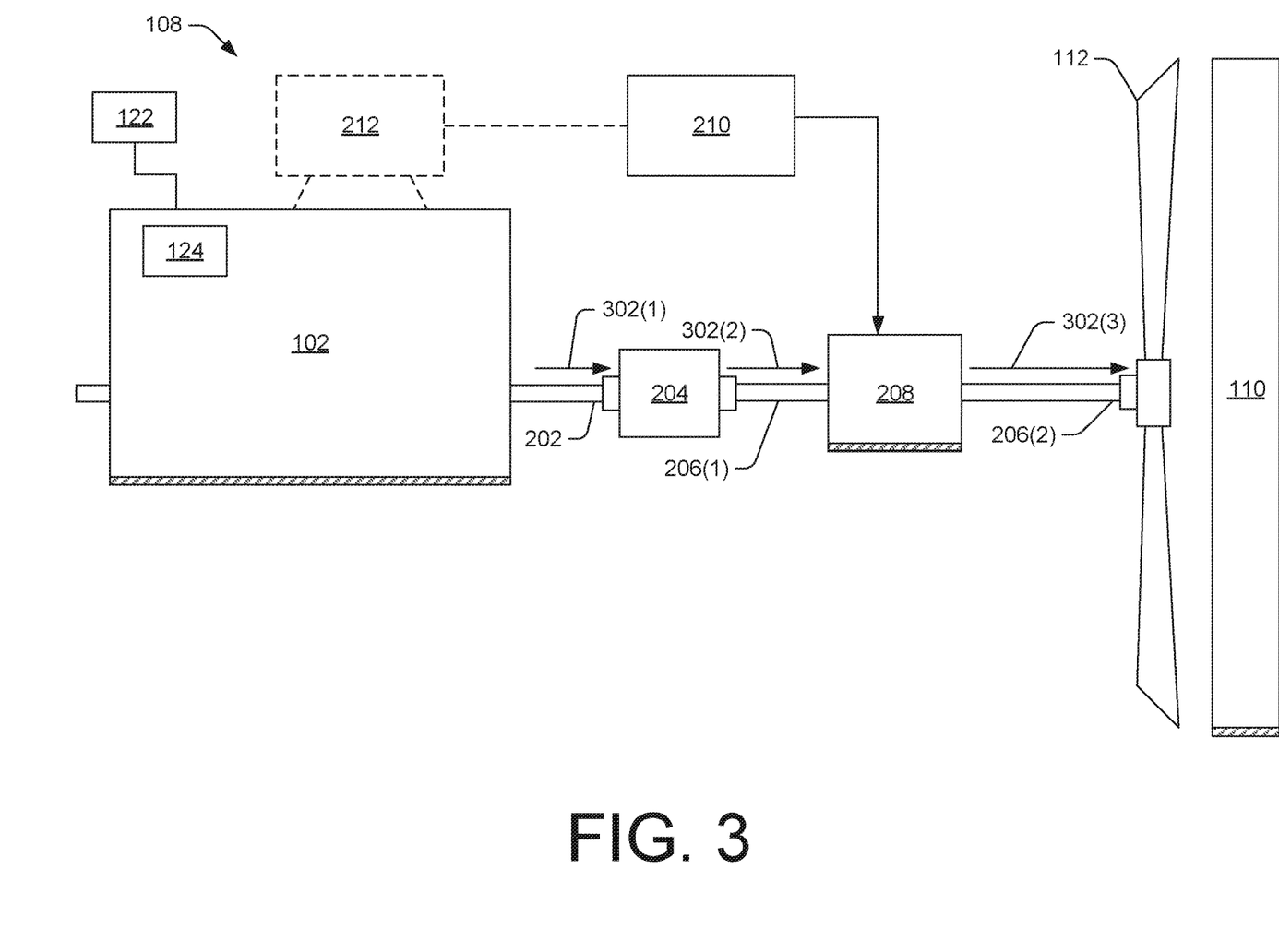
FIG. 3 is a schematic illustration of an engine radiator system showing a direction of power flow when an amount of power supplied to an electric motor included in the system is below a threshold amount in accordance with an example of the present disclosure.

FIG. 3 depicts an example diagram of the engine radiator system 108 showing the direction of shaft power flow 302 when an amount of power supplied to the electric motor 208 by the power source 210 is less than a threshold amount of power. As shown in FIG. 3, the power flow 302 is indicated by power flow arrows 302(1), 302(2), and 302(3). As described above, when the amount of power supplied to the electric motor 208 by the power source 210 is less than a threshold amount of power, the engine 102 imparts a rotational force on the shaft 206 of the electric motor 208 via the crankshaft 202 and the reduction drive 204. In such an example, the engine 102 outputs a rotational force by the crankshaft 202 that is transferred to the reduction drive 204 as shown by first power flow 302(1). As mentioned previously, the reduction drive 204 adjusts a rotational speed via gears, belt systems, etc. between drive shafts (the crankshaft 202 and the shaft 206) and transfers rotational energy from the crankshaft 202 to the first end 206(1) of the shaft 206 as shown by second power flow 302(2). As mentioned previously, the shaft 206 includes a single shaft and the rotational power is transferred along the shaft 206 to the radiator fan 112 as shown by the second power flow 302(2) and third power flow 302(3). Thus, the engine 102 may impart a rotational force on the radiator fan 112 via the power flow 302 shown in FIG. 3 when the amount of power supplied to the electric motor 208 is below a threshold amount of power. As mentioned previously, the controller 122 and/or governor 124 control an amount of fuel provided to the engine 102 such that the engine 102 drives rotation of the radiator fan 112 while maintaining a constant engine speed.

Figure 4:
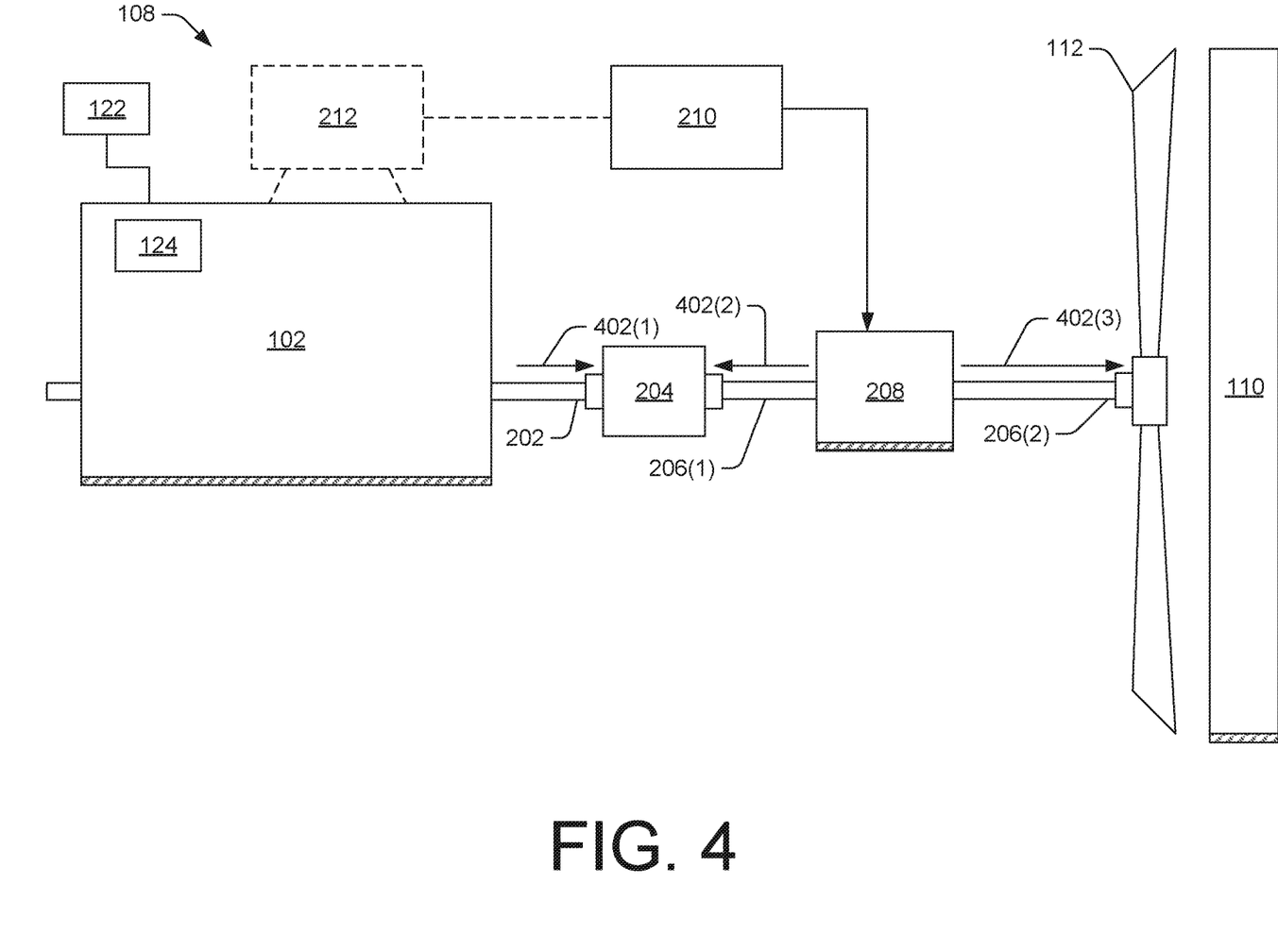
FIG. 4 is a schematic illustration of an engine radiator system showing a direction of power flow when an amount of power supplied to an electric motor included in the system meets a threshold amount in accordance with an example of the present disclosure.

FIG. 4 depicts an example diagram of the engine radiator system 108 showing the direction of shaft power flow 402 when an amount of power supplied to the electric motor 208 by the power source 210 is substantially equal to the threshold amount of power. As shown in FIG. 4, the power flow 402 is indicated by power flow arrows 402(1), 402(2), and 402(3). As described above, when the amount of power supplied to the electric motor 208 by the power source 210 is equal to (or substantially equal to) the threshold amount of power, the electric motor 208 may rotate the shaft 206 and thereby rotate the radiator fan 112. Thus, the electric motor 208 reduces and/or eliminates engine power loss experienced by the engine 102 by rotating the radiator fan 112. For example, the electric motor 208 may rotate the shaft 206 of the electric motor 208, thereby rotating the first end 206(1) of the shaft 206 shown by second power flow 402(2) and the second end 206(2) of the shaft 206 show by third power flow 402(3). When the threshold amount of power is supplied to the electric motor 208 by the power source, the electric motor 208 drives the radiator fan 112 as shown by third power flow 402(3) such that the second power flow 402(2) overcomes any frictional forces at the reduction drive 204. Thereby, the electric motor 208 rotates the shaft 206 such that rotation of the shaft 206 eliminates rotational resistance imparted on the crankshaft 202. Therefore, the crankshaft 202 may not transfer any rotational energy and the first power flow 402(1) would be equal to zero and thereby be eliminated. Thus, the electric motor 208 may compensate for power loss that is imparted on the engine 102 by rotating the radiator fan 112. As the electric motor 208 drives rotation of the radiator fan 112, the controller 122 and/or the governor 124 may reduce an amount of fuel provided to the engine 102 to maintain a constant engine speed as the parasitic load of driving the radiator fan 112 is reduced and/or eliminated.

Figure 5:
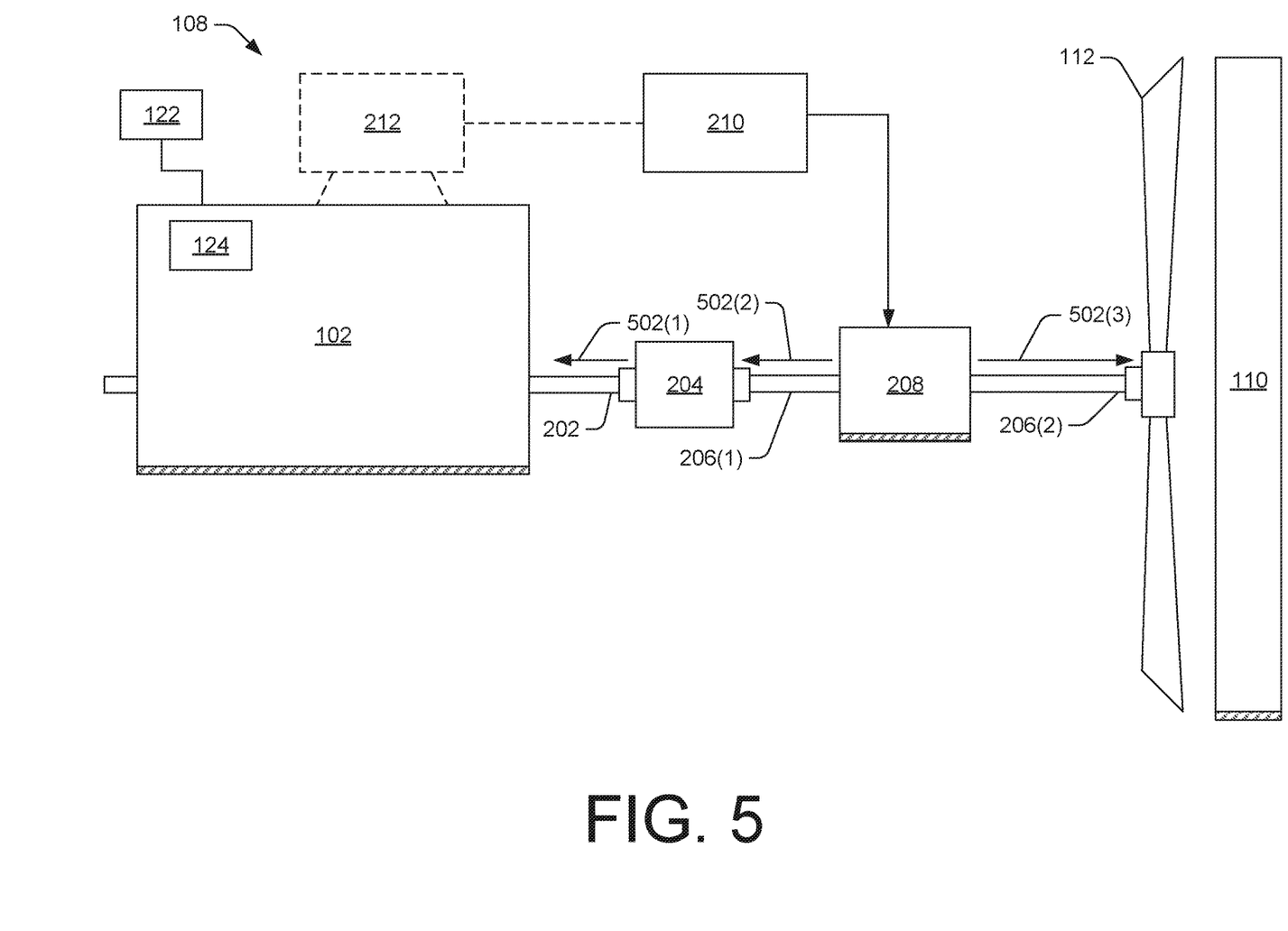
FIG. 5 is a schematic illustration of an engine radiator system showing a direction of power flow when an amount of power supplied to an electric motor included in the system exceeds a threshold amount in accordance with an example of the present disclosure.

FIG. 5 depicts an example diagram of the engine radiator system 108 showing the direction of shaft power flow 502 when an amount of power supplied to the electric motor 208 by the power source 210 exceeds the threshold amount of power. As shown in FIG. 5, the power flow 502 is indicated by power flow arrows 502(1), 502(2), and 502(3). As described above, when the amount of power supplied to the electric motor 208 by the power source 210 exceeds a threshold amount, the electric motor 208 may rotate the radiator fan 112 and may provide rotational power to the engine 102. Thus, the electric motor 208 provides power to the engine 102 when the amount of power exceeds the threshold amount. For example, the electric motor 208 rotates the shaft 206 of the electric motor 208, thereby rotating the radiator fan 112 shown by third power flow 502(3). At the same time, the shaft 206 of the electric motor imparts a rotational force on the reduction drive 204 shown by the second power flow 502(2). When the amount of power exceeds the threshold amount of power, excess rotational energy from the electric motor 208 may be imparted to the crankshaft 202, via the reduction drive 204, such that the electric motor 208 assists rotation of the crankshaft 202. Thus, the electric motor 208 may provide additional power to the engine 102 via the crankshaft 202 when the amount of power exceeds the threshold amount of power. As the electric motor 208 drives rotation of the radiator fan 112 and at least partially assists rotation of the crankshaft 202, the controller 122 and/or the governor 124 may reduce an amount of fuel provided to the engine 102 to maintain a constant engine speed as the electric motor 208 imparts a rotational force on the crankshaft 202 thereby providing additional rotational power to the engine 102.

Figure 6:
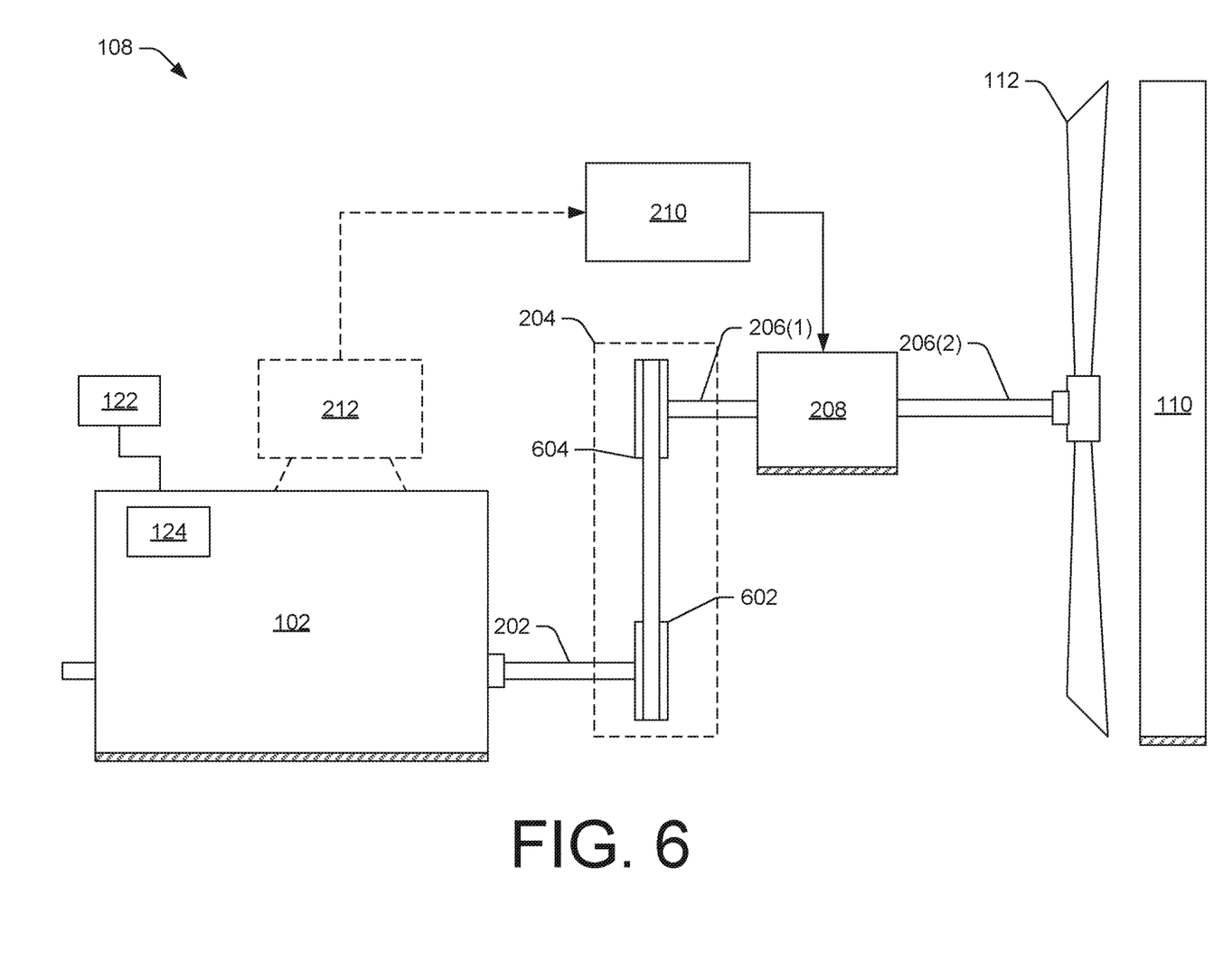
FIG. 6 is a schematic illustration of another engine radiator system in accordance with an example of the present disclosure.

FIG. 6 is an example diagram of an engine radiator system 108 including an example reduction drive 204. The example reduction drive 204 shown in FIG. 6 is a pulley and belt system. As shown in FIG. 6, the crankshaft 202 is coupled to a first pulley 602. The crankshaft 202 is fastened to the first pulley 602 via one or more fasteners (e.g., bolts, screws, etc.) or otherwise fastened to the first pulley 602. The first pulley 602 includes a first diameter. In some examples, the first end 206(1) of the shaft 206 of the electric motor 208 is coupled to a second pulley 604. The first end 206(1) is also be coupled to the second pulley 604 via one or more fasteners or otherwise fastened to the second pulley 604. The second pulley 604 includes a second diameter. The second diameter is different from the first diameter, in some examples. Furthermore, the reduction drive 204 shown in FIG. 6 includes a belt 606 rotatably coupled to the first pulley 602 and the second pulley 604, thereby transferring rotational energy therebetween. As mentioned previously, the first pulley 602 and the second pulley 604 may include different sizes in diameters. Thus, the reduction drive 204 transfers rotational energy from the first pulley 602 to the second pulley 604 via the belt 606 while shifting rotational speed of the crankshaft 202 relative to the shaft 206 of the electric motor. In some examples, the reduction drive 204 includes a series of pulleys and belts and therefore, include additional pulleys and/or belts. The reduction drive 204 may further include one or more cams, tensioners, idlers, etc. In some examples, the reduction drive 204 is a front end accessory drive (FEAD) system.

Figure 7:
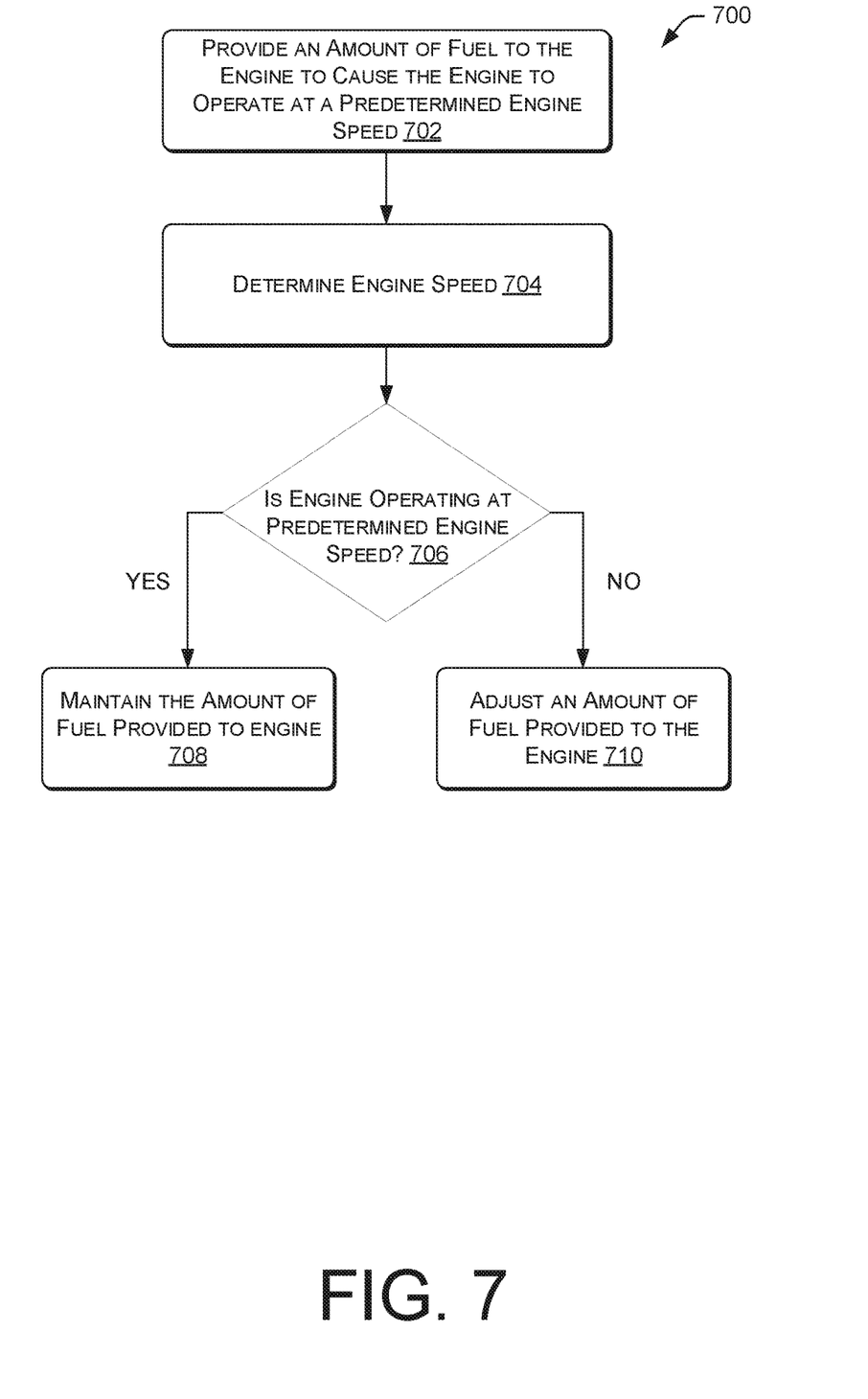
FIG. 7 is a flowchart illustrating a method of driving a radiator fan in accordance with an example of the present disclosure.

FIG. 7 shows an exemplary method 700 for driving a radiator fan 112 in an engine system 100. The example method 700 is illustrated as a collection of steps in a logical flow diagram, which represents operations that may be implemented in hardware, software, or a combination thereof. In the context of software, the steps represent computer-executable instructions stored in memory. Such computer-executable instructions may include routines, programs, objects, components, data structures, and the like that perform particular functions or implement particular abstract data types. The order in which the operations are described is not intended to be construed as a limitation, and any number of the described steps may be combined in any order and/or in parallel to implement the process. For discussion purposes, and unless otherwise specified, the method 700 is described with reference to the engine system 100, the engine radiator system 108, the controller 122, and the governor 124. In particular, and unless otherwise specified, the method will be described below with respect to the controller 122 for ease of description.

With reference to FIG. 7, at 702 the controller 122 may provide an amount of fuel to the engine 102 to cause the engine 102 to operate at a predetermined engine speed. For example, the controller 122 may provide an amount of fuel at a specific rate to be injected into the engine 102. Thus, the controller 122 may throttle the amount of fuel provided to the engine 102. The fuel is provided to the engine via one or more fuel pumps and fuel injectors. In some examples, the engine 102 includes a diesel engine and the amount of fuel provided to the engine 102 results in a specific engine speed. As mentioned previously, the engine system 100 includes a governor 124 (such as a constant-speed governor) that is configured to maintain a constant (or substantially constant) engine speed regardless of the load that is imparted on the engine 102. The engine system 100 may be configured to maintain a constant engine speed in order to generate constant electrical power. For example, a 60 Hz generator set may be configured to operate at 1800 RPM. Additionally, and/or alternatively, the engine system 100 may be configured to operate within a predetermined engine speed range (e.g., 1600-1800 RPM). Thus, the controller 122 may provide an amount of fuel to the engine 102 in order to maintain an engine speed at a predetermined engine speed or within the predetermined engine speed range as engine load and/or parasitic loads increase or decrease.

At 704, the controller 122 may determine engine speed of the engine 102. In some examples, the controller 122 determines the engine speed via one or more crankshaft position sensors 118. As mentioned previously, the engine speed is determined based on a number of revolutions that the crankshaft 202 completes in a minute represented as RPM. The engine speed may vary depending an engine load. For example, and as mentioned above, if the electric motor 208 receives a threshold amount of power, the electric motor 208 is configured to rotate the shaft 206, thereby rotating the radiator fan 112 and reducing and/or eliminating the parasitic load exerted on the engine 102 by driving the radiator fan 112. Furthermore, if the electric motor 208 receives an amount of power that is less than the threshold amount, the engine 102 is configured to drive (or partially drive) rotation of the shaft 206, via the crankshaft 202 and reduction drive 204, thereby rotating the radiator fan 112. Thus, the driving of the radiator fan 112 imparts a parasitic load on the engine 102, increasing the engine load. Alternatively, if the amount of power supplied to the electric motor 208 is greater than the threshold amount, the electric motor is configured to drive rotation of the shaft 206 such that the shaft 206 imparts a rotational force on the crankshaft 202 of the engine 102 via the reduction drive 204, thereby reducing and/or eliminating the parasitic load of driving the radiator fan 112 and decreasing engine load. Thus, the electric motor 208 may, in some examples, supplement engine power and thereby reduce engine load.

At 706, the controller 122 may determine whether the engine is operating at the predetermined engine speed. In some examples, the controller 122 compares the actual engine speed (determined at 704) with the predetermined engine speed to determine whether the actual engine speed is substantially equal to the predetermined engine speed. In some examples, the controller 122 determines whether the engine speed is within a predetermined engine speed range (or tolerance). In some examples, the controller 122 may not need to determine engine speed. For example, the governor 124 may be configured to automatically control an amount of fuel provided to the engine 102 in response to varying engine loads and/or parasitic loads.

If the controller 122 determines at 706 that the engine 102 is operating at a predetermined engine speed (or within a predetermined engine speed range), the controller 122 may maintain the amount of fuel that is provided to the engine 102 at 708. As mentioned previously, the governor 124 may be configured to maintain the engine speed by controlling the amount of fuel provided to the engine 102.

However, if the controller 122 determines at 706 that the engine 102 is not operating at the predetermined engine speed, the controller 122 may adjust the amount of fuel provided to engine 102 at 710. For example, if the engine speed is below the predetermined engine speed, the controller 122 may increase an amount of fuel provided to the engine 102 to increase engine speed. In some examples, the controller 122 may increase the amount of fuel via the governor 124. Additionally, and/or alternatively, the governor 124 may be configured such that the governor 124 increases or decreases the amount of fuel provided to the engine 102 in response to varying loads imparted on the engine 102. In some examples, the engine speed may decrease when additional load(s) are imparted on the engine. For example, as described above, if the electric motor 208 receives an amount of power (or no power) below a threshold amount, the radiator fan 112 may impart a parasitic load on the engine 102. If, however, the engine speed is above the predetermined engine speed, the controller 122 may decrease the amount of fuel provided to the engine 102 to decrease engine speed. For example, the controller 122 may adjust the amount of fuel provided to the engine based at least in part on an amount of power that is supplied to the electric motor 208. Specifically, if the electric motor 208 does not receive power or receives an amount of power below a threshold amount, the controller 122 provides an amount of fuel to the engine 102 such that the engine drives (or partially drives) rotation of the radiator fan 112. However, if the electric motor 208 receives at least a threshold amount of power, the electric motor 208 is configured to drive rotation of the radiator fan 112 via the shaft 206. Still further, if the electric motor 208 receives an amount of power that is greater than a threshold amount, the electric motor 208 is configured to drive rotation of the radiator fan 112 and to impart a rotational force on the crankshaft 202 of the engine via the reduction drive. As mentioned previously, in some examples, the governor 124 may automatically maintain constant engine speed by controlling the amount of fuel supplied to the engine 102.

INDUSTRIAL APPLICABILITY

The present disclosure describes an engine radiator system 108 that reduces engine power loss while rotating a radiator fan 112. The engine radiator system 108 includes an electronic motor 208 configured to drive the radiator 112 fan. The electric motor 208 includes a shaft having a first end coupled to a reduction drive 204 and a second end coupled to the radiator fan 112. An engine 102 rotates a crankshaft 202 that is also coupled to the reduction drive 204. Thus, rotational force is transferred between the crankshaft 202, the reduction drive 204, and the shaft 206 of the electric motor 208 to rotate the radiator fan 112.

The engine radiator system 108 provides a reduced cost system for rotating a radiator fan 112 that reduces and/or eliminates engine power loss that may be experienced by rotating the radiator fan 112 based on an amount of power supplied to the electric motor 208. The engine radiator system 108 described herein provides an alternative system for rotating the radiator fan 112 without significantly altering a radiator fan drive system. In some examples, the engine radiator system 108 is a passive system that does not require additional control logic to control the engine radiator system 108. The engine radiator system 108 described herein may be implemented in stationary (i.e., non-mobile) engine applications. Additionally, and/or alternatively, the engine radiator system 108 may be implemented in mobile engine applications.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:
1. A system, comprising:
an engine having a crankshaft;

an electric motor having a shaft, the shaft including a first end and a second end, the electric motor being configured to drive rotation of the shaft;

a power source in electrical communication with the electric motor, the power source configured to provide electrical power to the electric motor;

a reduction drive coupled to the crankshaft and to the first end of the shaft of the electric motor; and a fan coupled to the second end of the shaft of the electric motor, wherein:

rotation of the shaft of the electric motor drives rotation of the fan, and the electric motor is configured to impart a rotational force on the crankshaft of the engine, via the shaft and the reduction drive, based at least in part on an amount of power supplied by the power source to the electric motor being greater than a threshold amount.

2. The system of claim 1, wherein the engine is configured to drive rotation of the shaft, via the crankshaft and the reduction drive, based at least in part on an amount of power supplied by the power source being less than a threshold amount.

3. The system of claim 1, wherein the electric motor is configured to drive rotation of the shaft based at least in part on an amount of power supplied by the power source being equal to a threshold amount.

4. The system of claim 1, wherein the system further comprises a controller communicatively coupled to the engine system and configured to maintain a constant engine speed of the engine.

5. The system of claim 4, wherein the controller is configured to reduce an amount of fuel provided to the engine based at least in part on the electric motor imparting the rotational force on the crankshaft of the engine.

6. The system of claim 1, wherein the reduction drive receives the crankshaft rotating at a first speed and the reduction drive transfers rotational energy between the crankshaft and the shaft of the electric motor that rotates a second speed.

7. The system of claim 1, wherein a central portion of the shaft, disposed between the first end of the shaft and the second end of the shaft, is located within an internal space of a housing of the electric motor.

8. The system of claim 1, wherein the power source includes a turbo compounder configured to convert exhaust from the engine into electrical power that is provided to the electric motor.

9. An engine cooling system, comprising:

an engine having a crankshaft;

an electric motor configured to rotate a shaft including a first end and a second end;

a reduction drive mechanically coupled to the crankshaft and to the first end of the shaft of the electric motor; and a fan coupled to the second end of the shaft of the electric motor, wherein the electric motor is configured to rotate the fan and to impart a rotational force on the crankshaft of the engine via the shaft and the reduction drive, based at least in part on an amount of power supplied to the electric motor exceeding a threshold amount of power.

10. The engine cooling system of claim 9, further comprising a power source in electrical communication with the electric motor, the power source configured to provide electrical power to the electric motor.

11. The engine cooling system of claim 10, wherein the power source includes a turbo compounder configured to convert waste heat energy from the engine into electrical power that is provided to the electric motor via wiring, wherein the waste heat energy includes exhaust from the engine.

12. The engine cooling system of claim 9, further comprising a constant-speed governor configured to maintain a constant engine speed of the engine.

13. The engine cooling system of claim 9, wherein the engine cooling system is configured such that the engine rotates the fan in addition to the electric motor when the electric motor receives an amount of power that is less than the threshold amount of power, the engine rotating the fan via the crankshaft, the reduction drive, and the shaft of the electric motor.

14. The engine cooling system of claim 9, wherein the reduction drive includes a pulley and belt system that transfers rotational energy between the crankshaft and the electric motor.

15. The engine cooling system of claim 9, wherein the crankshaft rotates at a first speed and the shaft rotates at a second speed and the reduction drive is configured to transfer rotational power between the shaft and the crankshaft.

16. A method for driving a radiator fan in an engine system, the method comprising:

providing, via at least one of a controller or a governor, a first amount of fuel to an engine to cause the engine to operate at a predetermined engine speed;

determining, via one or more sensors and by the controller, an engine speed of the engine;

determining, via the controller, that the engine speed is outside of a predetermined engine speed range of the predetermined engine speed, the engine speed being outside of the predetermined engine speed range based at least in part on an amount of electric power supplied to an electric motor coupled to the radiator fan via a shaft and configured to drive rotation of the radiator fan, wherein the electric motor is configured to impart a rotational force on a crankshaft of the engine based at least in part on the amount of electric power supplied to the electric motor being greater than a threshold amount of power; and providing, via at least one of the controller or the governor, a second amount of fuel to the engine to cause the engine to operate at the predetermined engine speed.

17. The method of claim 16, wherein the electric motor is configured to drive rotation of the radiator fan, via the shaft, based at least in part on the amount of electric power supplied by a power source being at least equal to a threshold amount of power.

18. The method of claim 16, wherein the engine is configured to at least partially drive rotation of the radiator fan, via a crankshaft, a belt and pulley system, and the shaft, based at least in part on the amount of electric power supplied to the electric motor being less than a threshold amount of power.

* * * * *